United States Patent
Schröter et al.

(10) Patent No.: US 6,784,946 B1
(45) Date of Patent: Aug. 31, 2004

(54) ASSEMBLY, IN WHICH LIGHT FROM A LIGHT SOURCE IS DIRECTED ONTO A SURFACE

(75) Inventors: Gudrun Schröter, Jena (DE); Christfried Symanowski, Arthur-Becker-Strasse (DE)

(73) Assignee: Carl Zeiss Jena GmbH, Jena (DE)

( * ) Notice: Subject to any disclaimer, the term of this patent is extended or adjusted under 35 U.S.C. 154(b) by 382 days.

(21) Appl. No.: 09/857,331

(22) PCT Filed: Sep. 29, 2000

(86) PCT No.: PCT/EP00/09561
§ 371 (c)(1),
(2), (4) Date: Jun. 4, 2001

(87) PCT Pub. No.: WO01/27683
PCT Pub. Date: Apr. 19, 2001

(30) Foreign Application Priority Data

Oct. 8, 1999 (DE) ...................... 199 485 429

(51) Int. Cl.$^7$ ................................ H04N 5/74
(52) U.S. Cl. .................. 348/771; 348/781; 353/98
(58) Field of Search ............... 348/781, 759, 348/760, 782, 771; 353/98, 84, 99, 69, 119; 356/328

(56) References Cited

U.S. PATENT DOCUMENTS

| 5,504,575 A | 4/1996 | Stafford |
| 5,633,691 A | 5/1997 | Vogeley et al. |
| 6,252,638 B1 * | 6/2001 | Johnson et al. ............. 349/5 |
| 6,322,219 B1 * | 11/2001 | Okamori et al. ........... 353/98 |
| 6,525,814 B1 * | 2/2003 | Hendrick, Jr. et al. ...... 356/328 |

FOREIGN PATENT DOCUMENTS

| EP | 09098442 | 4/1997 |
| WO | WO96/36184 | 11/1996 |

* cited by examiner

*Primary Examiner*—Victor R. Kostak
(74) *Attorney, Agent, or Firm*—Eugene E. Renz, Jr.

(57) ABSTRACT

An arrangement in which the light emitted by a source of light (44) is directed by means of illumination optics (12) onto a surface (25) by which an image can be generated that can be projected by means of projection optics (4), onto a screen, wherein the illumination optics (12) have an optical device (28) arranged following the source of light and a prism (10) positioned between the surface (25) and the optical device (28), and the light coming from the optical device (28) is deflected without reflection by means of the prism (10) herein the optical device (28) has a first optical axis (29), and wherein said projection optics comprises a first and a second partial optics (22, 24) having a shared second optical axis (20) and in that the surface (25) is reflective, whereby the first optical axis (29), together with the second optical axis (20), includes an angle that is smaller than 90°, and whereby the optical device (28) lies outside of an area that is traversed from the second partial optics (24) to the first partial optics (22) by the light that is reflected off the surface (25.)

9 Claims, 4 Drawing Sheets

ASSEMBLY, IN WHICH LIGHT FROM A LIGHT SOURCE IS DIRECTED ONTO A SURFACE

Figure 1:
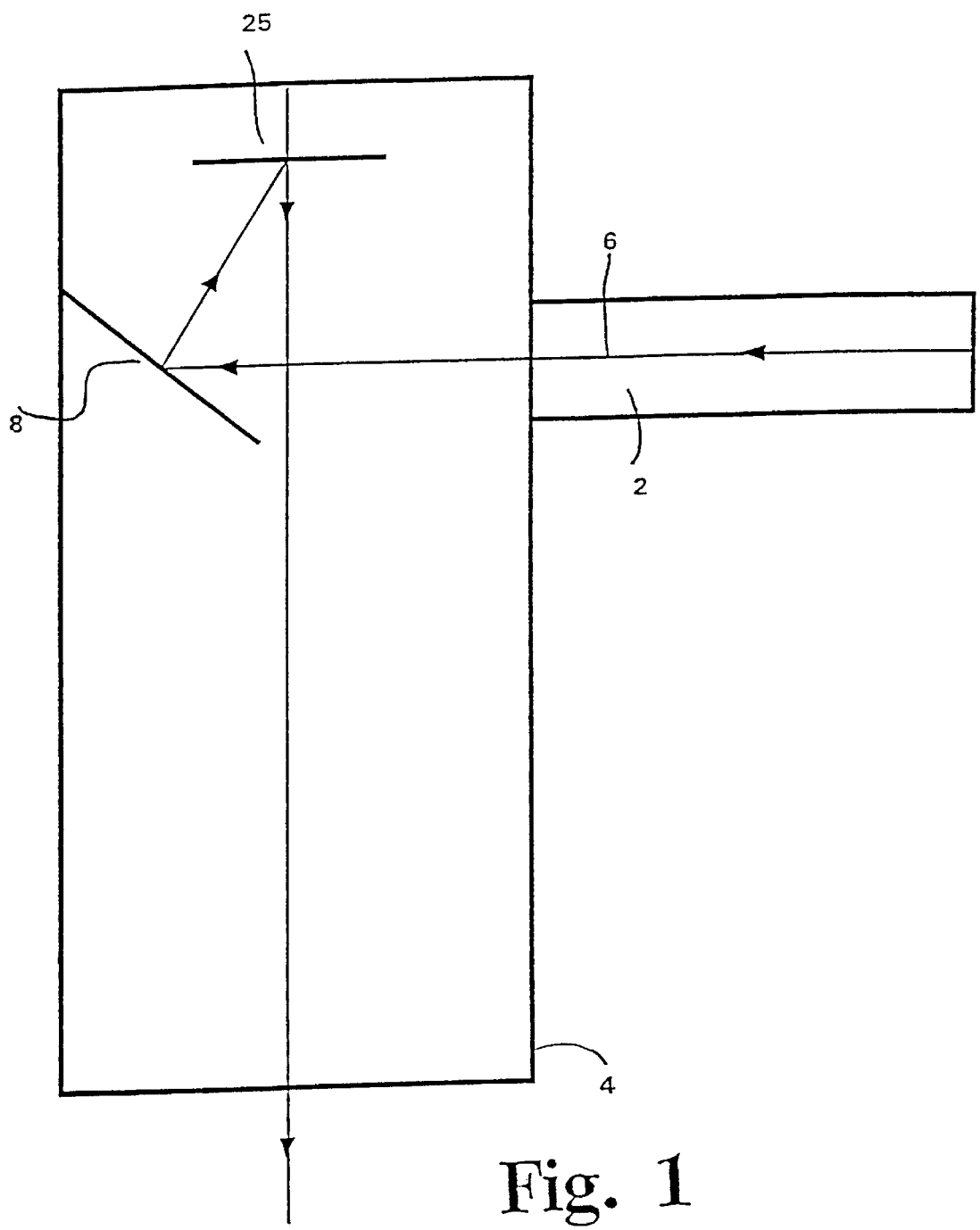

The invention relates to an arrangement in which the light emitted by a source of light is directed by means of an illumination optics onto a surface on which an image can be focussed that can be detected by means of a projection optics.

Examples of such arrangements are slide or film projectors in which, for purposes of attaining uniform illumination, a light bundle stemming from a light source is projected by means of a condenser onto a slide or film image that is then subsequently displayed on a screen with an objective as the projection optics.

In particular, however, the subject matter being addressed here is a recent technology in which deformable mirror matrices serve to generate video images. These deformable mirror matrices consist of an array of individual deformable mirrors that can assume two states, namely, zero and one, depending on the selected direction of reflection. The number of rows and columns of the array corresponds to the video standard for lines and pixels per line of the video image to be depicted. In order to also allow gray scale or colors on the part of individual pixels, the deformable mirrors associated thereto are pulse code modulated, depending on the pixel information, so as to rapidly switch these deformable mirrors back and forth between reflection in one of the two directions and reflection in the other direction, so that, on the average over time, the duty cycle between the states zero and one gives rise to a corresponding intermediate value between light and dark. Such deformable mirror matrices can be obtained, for instance, from Texas Instruments Incorporated.

As in the case of the known projectors mentioned above, the optics employed for such deformable mirror matrices consist of an illumination optics of the deformable mirror matrix and of a projection optics that is normally referred to as an objective, in order to project the image content onto a screen, a process in which both front and rear projection is possible.

The term screen as used here should be understood in its broadest sense. Especially for show applications, screen here also refers, for example, to the vapor of a smoke-making machine or to a wall of water.

Owing to space problems with the illumination, up until now, optics having a long focal length have been used as the illumination optics and as the projection optics, so that a certain size has always been necessary for these projectors with deformable mirrors. Moreover, due to the long light distances, loss of light is possible, which is why a greater input power is required and thus more heat also needs to be dissipated which, in turn, calls for a larger size. Consequently, with smaller projectors, and thus also with the demand for reduced heat generation, an image with large screen diagonals is not possible at all.

However, there is an avid interest in small and bright projectors. They should be easy to transport and capable of generating a sufficiently bright image of a suitable size under normal indoor lighting conditions. Efforts are already under way to replace the portable projectors that are just now coming onto the market by the next generation of considerably smaller projectors, the so-called palm-top projectors. Such projectors call for substantially smaller optics systems, both for the illumination optics and for the projection optics. It would be conceivable to try to achieve this through the miniaturization of the known optics, although the size of the light bulb, the heat problem and the resultant additional cooling means would always define a lower limit. Moreover, the deformable mirror matrices always have to be of a certain size in order to be able to reflect a sufficient amount of light.

A similar set of problems is also found when it comes to reflective LCD's.

The objective of the invention is to provide a new arrangement for illumination and projection purposes which allows the construction of such miniaturized projectors.

This objective, which at first appeared to be unattainable in view of the above-mentioned requirements, is achieved on the basis of the above-referenced state of the art in that the illumination optics (first optics) has an optical means located beyond the source of light and a prism positioned between the surface and the optical means, whereby the light coming from the optical means is deflected without reflection by means of the prism. In this manner, the first optics, namely, the illumination optics, can be situated very close to the other optical elements of the projection optics (second optics) and, in the extreme case, parallel to the optical axis of the second optics. As a result, the compactness of the projector can be drastically increased, as will be elaborated upon in greater detail below with reference to embodiments. The essential aspect here is that the light incident upon the prism is only deflected by refraction.

Even greater compactness can be achieved according to another refinement in which the second optics is divided into a first and a second partial optics, whereby the first and second partial optics have a shared optical axis. The first optics contains the optical means and the second partial optics, so that the second partial optics is a component of the first partial optics as well as of the second partial optics. The incident light needed for the illumination stems from the optical means (third partial optics). In order to allow a projection, the light that comes from the third partial optics and that is incident upon the second partial optics includes an angle relative to the shared optical axis, whereby the third partial optics lies outside of an area that is traversed from the second to the first partial optics by the light that is reflected off the surface.

The fact that such a breakdown into a first, second and third partial optics is possible is, at first, unexpected since, in view of the prescribed long focal lengths, the current state of the art requires small apertures for the illumination of the deformable mirror matrix cited as an example as well as for depicting their image content; as experience has shown, this leads to the situation wherein the beam paths of the illumination light and of the reflected light then have to overlap. Due to the small aperture angles that are normally employed, it would fundamentally not be possible to use partial optics to uncouple the light path lengths of the light bundle that is incident upon the deformable mirror matrix from that of the light reflected by the deformable mirror matrix. Only now, with the arrangement according to the invention, has it become possible to realize partial optics having appropriately short focal lengths, as a result of which the useable apertures can be selected so as to be sufficently large, and a sufficiently large path can be kept free for the third partial optics, so that the light emerging from the deformable mirror matrix can pass through unhindered. The special configuration of such optics is known to the person skilled in the art.

This further development differs markedly from the familiar approaches for the miniaturization of known devices. In particular, it could have been expected that the person skilled in the art, after recognizing the heat problem associated with miniaturization, would have dedicated a great deal of her/his thoughts to designing a particularly space-saving cooling system.

A suitable cooling system, however, generally does not pose any problem with this arrangement, since the main heat-generating elements, namely, the deformable mirror matrix as well as the source of light, are located outside of the three partial optics. The back of these elements remains completely free, so that, in contrast to the known arrangements, no special attention needs to be paid to the space for the cooling means, a space that might have to be left free for optical elements. Consequently, a compact, efficient cooling system can be used for the deformable mirror matrix.

Unexpectedly, it has turned out that this arrangement also accounts for increased light intensity. This is due to the fact that, in view of the smaller focal lengths needed for illumination and for collecting the light that comes from the deformable mirror matrix and that is then to be projected, the distance from the deformable mirror matrix to the optics can be kept considerably smaller than in the case of the state of the art, so that less light is lost.

A prism can also be configured in such a way that light bundles of different colors are separated and, after this split, they are then directed onto different deformable mirror matrices on which differing color separations are focussed in order to depict color images. In comparison to other solutions, for instance, with a color wheel, this accounts for an overall greater light output relative to the electric power that has been fed in.

Owing to the underlying principle here, the third partial optics can be designed, for example, in such a way that a light source focussed onto a point is imaged again by this partial optics onto the point of the deformable mirror matrix cited as an example. However, it has turned out to be considerably simpler in terms of the uniformity of the image if the third partial optics is designed in a focussing manner, that is to say, if it converts a parallel beam into a point. Then, on the input side of the second partial optics, a parallel beam can be assumed that is subsequently focussed on the deformable mirror matrix for imaging purposes. Even though in this case, generally more space is needed for the third partial optics in order to guide the light to the input side of the second partial optics so as to generate the parallel light beam, this greatly increases the uniformity of the illumination. Then, there is no need for more space when the above-mentioned device is used for purposes of deflecting the beam path.

As already made clear above, the invention entails the special advantage that it allows the optimization of apertures for imaging and for illumination purposes. In particular, the following embodiments of the invention have proven to be especially advantageous, namely, those wherein the second partial optics on the side of the light source has an aperture greater than 0.3 and especially 0.5, and the third partial optics is designed for an illumination angle $\theta$ on the surface which is configured so as to reflect behind the second partial optics with $\sin\theta$ smaller than 0.3 and especially smaller than 0.2. As the aperture increases, a smaller distance than is known from the state of the art becomes possible between the deformable mirror matrix cited as an example (reflecting surface) and the first or the second optics.

Due to this favorable aperture for the illumination, it is ensured in a simple manner that the light coming from the deformable mirror matrix can be projected by the illumination optics onto a screen without hindrance.

The above-mentioned features turn out to be particularly advantageous when the reflective surface is a rectangular imaging element, especially a deformable mirror matrix or a reflective LCD, and when the light bundle that is incident upon the third partial optics has a rectangular beam profile adapted to the aspect ratio of the light bundle.

The advantage of the use of the arrangement according to the invention with a deformable mirror matrix has already been elaborated upon above. In view of the fact that the light bundle has a rectangular beam profile adapted to the aspect ratio of the light bundle, the light used for the illumination can be transmitted almost in its entirety onto the deformable mirror matrix, as a result of which a maximum light intensity is generated on the image.

When it comes to deformable mirror matrices, it is likewise advantageous for the illumination to be as uniform as possible. In order to be able to save on optical components here, according to an advantageous embodiment of the invention, a mixing rod is provided in order to generate the rectangular beam profile before the third partial optics. A mixing rod mixes the light emitted by a light source by means of multiple reflections. For this purpose, it is possible to employ, for example, a cuboid rod with rectangular incident and emergent surfaces, whereby total reflection takes place multiple times as the light passes from the source of light to the surface area, so that the place on the base of the prism-shaped mixing rod, from which the light emerges, is practically independent of the place of incidence. This creates a uniformly illuminated rectangular field that is imaged onto the deformable mirror matrix.

In principle, this mixing rod, too, can be arranged either before or after the third partial optics. With an eye towards promoting a compact design, however, it has been proven to be extremely advantageous when the mixing rod is placed between the illumination means and the third partial optics.

When this deformable mirror matrix technology is used to depict color images and when only one single matrix is used, it is common practice to provide a color wheel. A color wheel of this type known from the state of the art is a circular disk whose circumference has several sectors having different color filters. In order to generate a color image, this color wheel is spun rapidly, as a result of which the light is filtered sequentially according to different colors.

The information content on the deformable mirror matrix is also synchronized with the appertaining colors of the individual color filters through which the light passes in order to illuminate the matrix. Owing to the persistence of vision and to the adjusted rotational speed of the color wheel, the differing colors are perceived simultaneously and the various color separations sequentially focussed on the deformable mirror matrix are perceived as a single colored video image.

According to an advantageous embodiment, however, a deviation is made from this construction in that, for purposes of depicting color images, a single deformable mirror matrix as well as a color wheel are provided, whereby the color wheel is designed as a surface area of a cylinder that is divided into sectors with filters having different colors and that covers the incident and/or emergent surfaces of the mixing rod. In this manner, a particularly compact arrangement is achieved since, owing to the cylindrical design in comparison to the known circular disk, only a single dimension perpendicular to the longitudinal extension of the mixing wheel is used for the color wheel. This will be elaborated upon in greater detail below with reference to the figures.

Normally, such optics according to the state of the art call for great adjustment efforts in order to coordinate the individual axes with each other. Here, however, according to a preferred embodiment of the invention, it has been found to be advantageous that the adjustability of the position and/or angularity of the deformable mirror matrix serves as an element for the alignment.

The possibility to correct the angle and the distance is sufficient in order to optimally set the direction of illumination as well as the passage of light through the first and second partial optics.

In another advantageous embodiment of the arrangement according to the invention, the optical means has a first optical axis and the second optics has a second optical axis that is perpendicular to the surface whereby, as seen in a top view and in a side view, the first optical axis, together with the second optical axis, includes an angle that lies between 0° and 90° in each case. Moreover, an incident surface of the prism facing the optical means is arranged in such a way that, as seen in the side view and in the top view, the first optical axis is not positioned perpendicular to the incident surface. With this embodiment, the optical means can be arranged laterally adjacent to and above the second optics so that a very compact arrangement is obtained. Furthermore, through the arrangement of the prism, the two optical axes can be skewed with respect to each other, thus resulting in great design freedom.

The arrangement according to the invention can be advantageously further developed in that the optical axis of the optical means runs parallel to the optical axis of the second optics. Consequently, the optical means can be placed directly above the second optics, with the result that the arrangement according to the invention acquires a very streamlined design.

Figure 2:
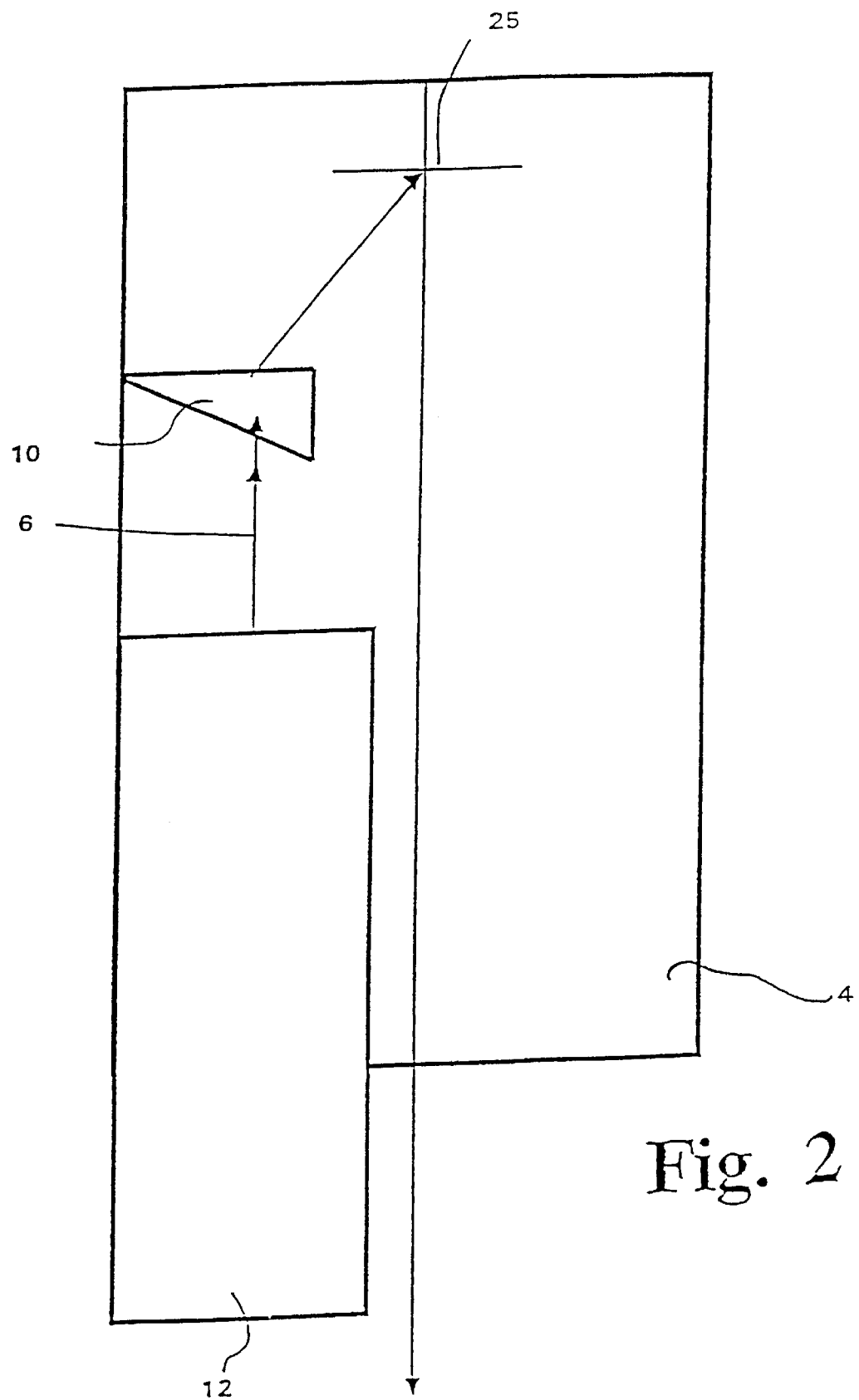
Figure 3:
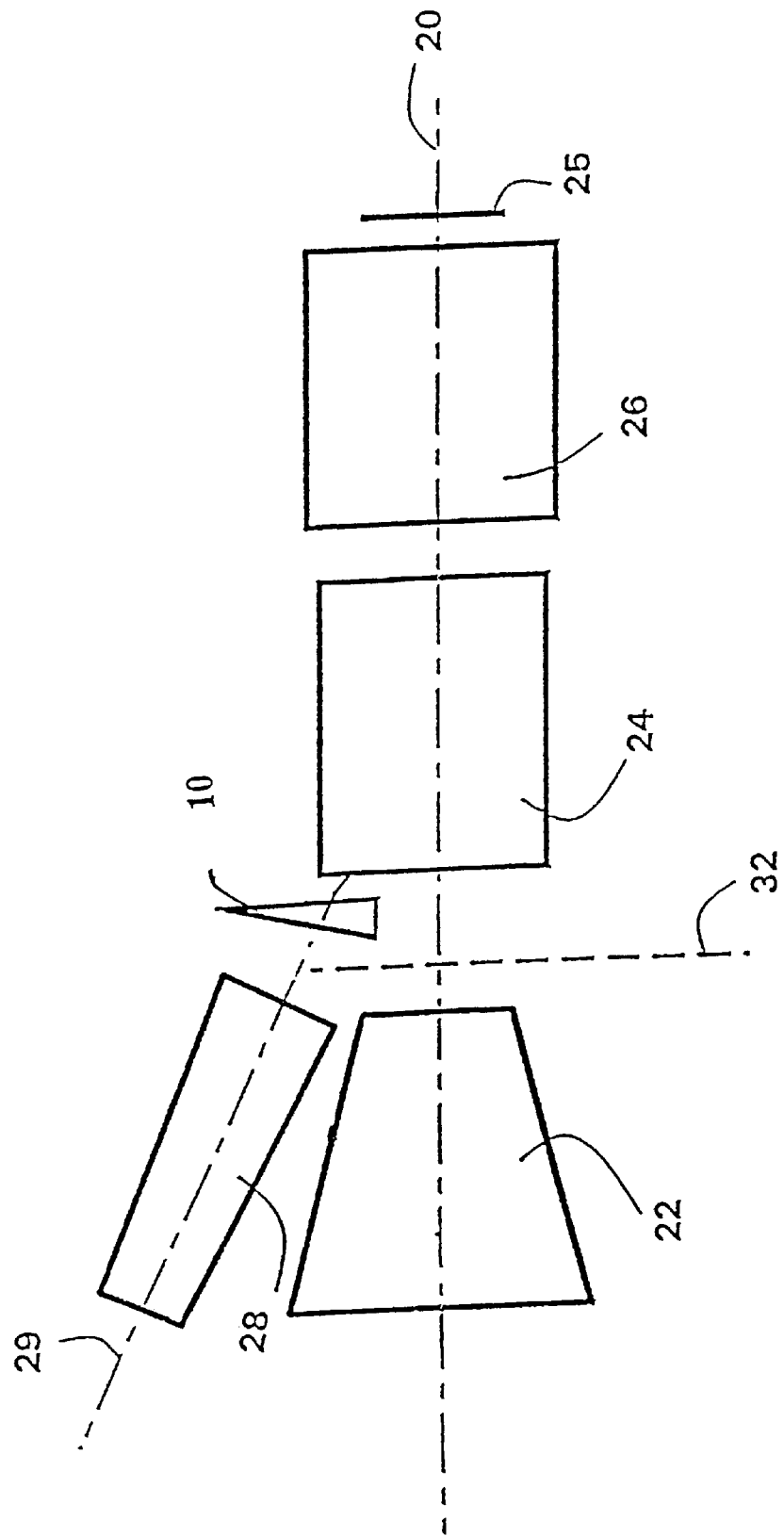
Figure 4:
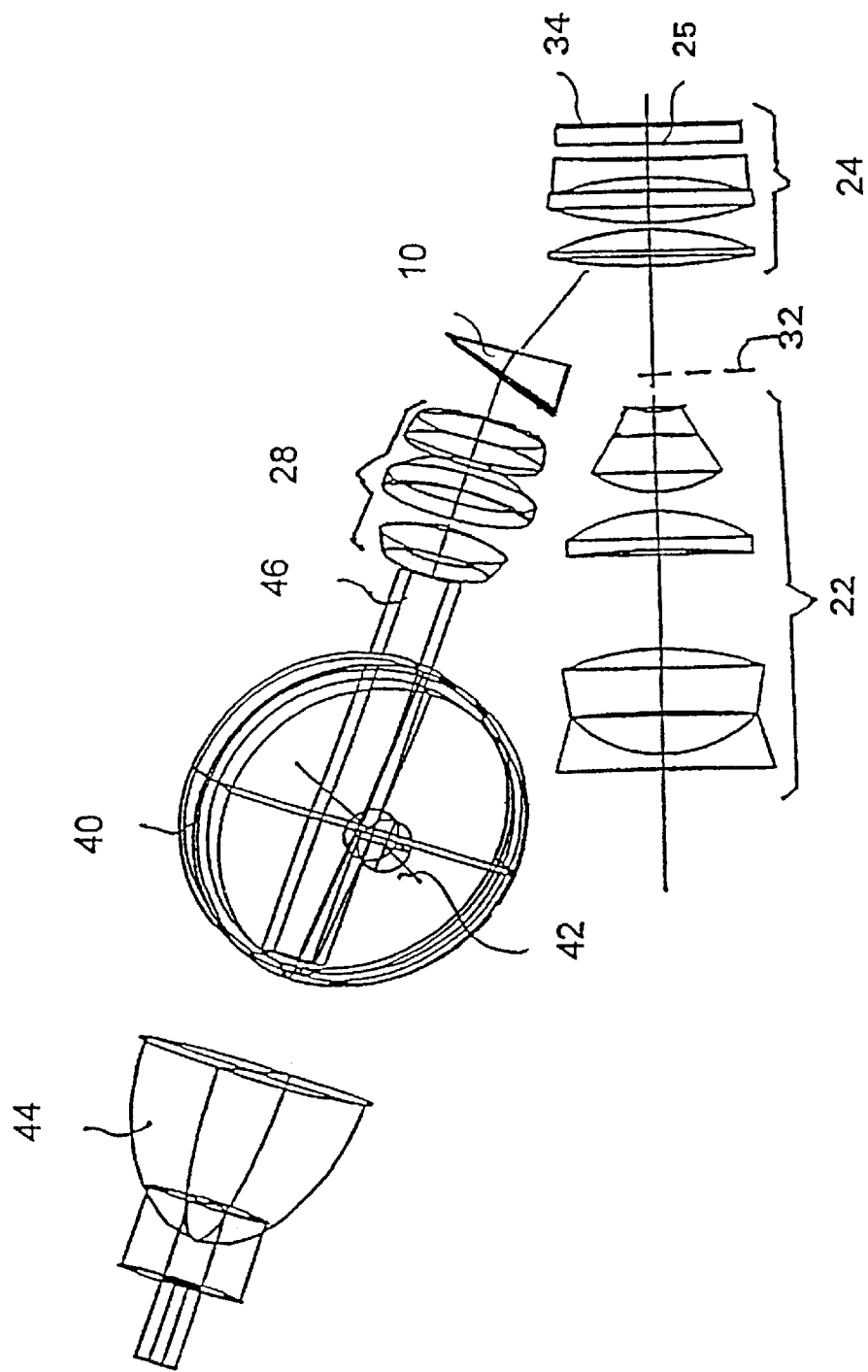

The invention will be explained in greater detail below with reference to embodiments in conjunction with the accompanying drawings. The following is shown:

FIG. 1 a schematic representation of the position of the illumination optics and of the projection optics in a reflected-light projector;

FIG. 2 a schematic representation of the position of the illumination optics and of the projection optics with a wedge-shaped prism;

FIG. 3 a schematic representation for purposes of illustrating the structure of the illumination optics and of the projection optics consisting of three partial optics;

FIG. 4 a detailed example of an embodiment with three partial optics and a wedge-shaped prism.

The principle used in the invention will be thoroughly elaborated upon in reference to FIGS. 1 and 2. The schematic representation of FIG. 1 shows a optics 2 that serves to illuminate the image focussed on a reflective surface 25. In the embodiments that follow, this surface 25 is realized in the form of a deformable mirror matrix.

Coming from an illumination optics 2, which is positioned perpendicular to the projection optics, a light bundle 6 is incident upon a mirror 8 which, generally speaking, can be a reflective surface of a prism, by means of which the light bundle is projected at a suitable angle onto the matrix situated in the surface 25.

It can be clearly seen that, due to the protruding projection optics 2, there is a need for more space. In contrast to FIG. 1, FIG. 2 has a prism 10 for deflection purposes. Moreover, the illumination optics 12 lies above the projection optics 4. The prism 10 is aligned in such a way that it directs the light bundle 6 that serves for illumination at a suitable angle onto the surface 25 (deformable mirror matrix). Here, the light bundle 6 is deflected by means of the prism only through refraction and without reflection.

A comparison of FIG. 2 with FIG. 1 clearly shows the more compact structure.

Even greater compactness as compared to conventional illumination optics and projection optics can be achieved by using three partial optics, two of which serve as illumination optics and two as projection optics, whereby one of the partial optics located in the vicinity of the reflective surface 25 is shared by both optics systems.

This will now be further elucidated with reference to FIG. 3.

A first partial optics 22 and a second partial optics 24 are arranged on an optical axis 20 and these two partial optics together form a projection optics by means of which an image on a reflective surface 25 is depicted on a projection screen. Here, the reflective surface 25 is configured as a digital deformable mirror matrix (DMD matrix) of the type already described above. If, however, instead of a single DMD matrix, three matrices are to be used for the various color separations, it is optionally also possible to employ a prism 26 with which the illumination light is split into light bundles of three different colors which are then directed at three different DMD matrices arranged at an angle.

Instead of directing a separate illumination optics, as is known from the state of the art, onto the reflective surface 25 for illumination purposes, the suggestion is made to concurrently use the second partial optics 24 for illumination purposes and to deflect the light provided for this onto the second partial optics 24 via a third partial optics 28 and via a means for deflection. In the example of FIG. 3, a prism 10 is shown as the means for deflection.

In contrast to the state of the art, in the case at hand here, considerably smaller focal lengths are obtained since the second partial optics 24 is also employed as the partial optics 24 for projection purposes. For this reason, the reflective surface 25 can be brought considerably closer to the second partial optics 24. The focussing capability is improved so that more light is available for the projection than is the case with the state of the art.

The resultant favorable aperture values for the light used for illumination and the light gathered for projection also allow the reflective surface 25 to be brought closer to the second partial optics.

The apertures of the entire optics system, as will become clear on the basis of the figures that follow, are configured in such a way that the light to be projected runs through the optics 24 and 26 outside of an area in which the illumination light is directed onto the reflective surface 25. This means that the prism 10 used to couple the light of the projection does not pose a hindrance since it is not located in the beam path of the projection optics. This is why the total amount of light stemming from the reflective surface 25 can be used for the projection.

For such a configuration, it has been found to be particularly advantageous if the second partial optics 24 is a focussing optics that transmits the light reflected by the reflective surface 25 into the pupil plane 32 of the second optics, which is also the pupil plane of the second optics, from where the first optics 22 projects the image onto the projection wall.

Moreover, the light coming from the third partial optics 28 is also projected onto the pupil surface 32. In order to do so, it has proven to be particularly advantageous from an optical standpoint if the prism 10 is situated close to the pupil surface 32, as shown in FIG. 3.

FIG. 4 shows the example of an embodiment in which a single DMD matrix 34 is used on the surface 25. In this context, the angle and position of the DMD matrix 34 can be adjusted for purposes of optical alignment. The partial optics 22, 24 and 28 are shown in greater detail as optics groups in FIG. 4.

In order to depict color images with a single deformable mirror matrix, however, it is also possible to employ a color wheel. FIG. 4 shows a special color wheel 40 for this purpose. In contrast to the state of the art, this color wheel is not a disk, but rather is configured as the surface area of a cylinder, whereby its cylinder length only has to be approximately the size of the light bundle upstream from the third partial optics 28. This saves space in comparison to the known color disk. This surface area is provided with different color filters which, in the embodiment, are formed by means of dielectric layers. This color wheel is turned at a rate faster than 1/10 rotations per second around its rotational axis 42 so that, due to the persistence of vision, an observer simultaneously perceives the colors generated on the surface area by the color filters provided. The image content of the DMD matrix 34 is synchronously set to these colors. Therefore, the eye of an observer experiences a color image projected via the partial optics 22.

In order to illuminate the DMD matrix 34 as uniformly as possible, a mixing rod 46 is also provided. It is in the form of a glass rod on whose surface area total reflection takes place. As a result of the multiple total reflection on the sides, the information of the source of the light emission is lost, so that a uniformly illuminated rectangular field results at the end of the mixing rod 46. This uniformly illuminated rectangular field is directed onto the DMD matrix via the third partial optics 28 and via the second partial optics 24. Here, it is especially advantageous to have a rectangular mixing rod 46 whose aspect ratio of the emergent surface has been adapted to the dimensions of the DMD matrix 34 so as to lose as little primary light from the light bulb 44 as possible for its illumination.

The use of this embodiment for purposes of imaging with DMD matrices has proven to be advantageous particularly in the depiction of video images with screen diagonals larger than 2 meters. The optical elements are arranged in a particularly compact manner. Since the electronics can also be kept small by means of miniaturization, the resulting device can easily be transported in a briefcase. Consequently, such devices are especially well-suited for video demonstrations at trade fairs but also for fine artists as well as sales representatives who would like to make video presentations to a small or large audience. Through the use of the prism 10, the position of the third partial optics 28 and thus also the position of the light bulb 44 can be chosen independently of the second optics 22, 24. In order to achieve a particularly compact design, the light bulb can be arranged above and next to the end of the first partial optics 22 facing the surface 25. In this case, the third partial optics 28 is then arranged in such a way that, seen in a top view as well as in a side view, its optical axis 29 includes an angle with the optical axis 20 of the first and second partial optics 22, 24 that lies between 0° and 90°. With this arrangement, in order for the light emitted by the third partial optics 28 to be directed onto the surface 25 at an angle that is suitable for projection, the prism 10 is placed between the third and second partial optics 28, 24 in such a way that the incident surface of the prism facing the third partial optics 28, together with the optical axis 29 of the third partial optics 28, seen in a top view as well as in a side view, includes an angle that is not equal to 90°. As a result, the incident light is deflected in two spatial directions. Preferably, the angle between the two optical axes 29 and 20 is 0° to 40° seen in the top view and the angle is, for instance, 15° seen in the side view.

Moreover, it is also preferred if the emergent surface of the prism 10 facing the surface 25 together with the optical axis 29 includes an angle that is not equal to 90°, seen in a top view as well as in a side view.

What is claimed is:

1. An arrangement in which the light emitted by a source of light (44) is directed by means of illumination optics (12) onto a surface (25) by which an image can be generated that can be projected by means of projection optics (4), onto a screen, wherein the illumination optics (12) have an optical device (28) arranged following the source of light and a prism (10) positioned between the surface (25) and the optical device (28), and the light coming from the optical device (28) is deflected without reflection by means of the prism (10) wherein the optical device (28) has a first optical axis (29), and wherein said projection optics comprises a first and a second partial optics (22, 24) having a shared second optical axis (20) and in that the surface (25) is reflective, whereby the first optical axis (29), together with the second optical axis (20), includes an angle that is smaller than 90°, and whereby the optical device (28) lies outside of an area that is traversed from the second partial optics (24) to the first partial optics (22) by the light that is reflected off the surface (25).

2. The arrangement according to claim 1, characterized in that the second partial optics (24) is designed in a focusing manner.

3. The arrangement according to claim 1, wherein the optical device (28) has an aperture of more than 0.3, and especially 0.5, on the side of the source of light (44).

4. The arrangement according to claim 1, wherein the optical device (28) is designed in such a way that the second partial optics has an aperture of less than 0.3, and especially less than 0.2, on the side of the surface (25).

5. The arrangement according to claim 1, wherein the surface (25) is a rectangular imaging element, particularly a deformable mirror matrix (34) or a reflective LCD, and the light bundle incident upon the optical device (28) has a rectangular beam profile adapted to the aspect ratio of the imaging element.

6. The arrangement according to claim 5, wherein a mixing rod (46) is provided for purposes of generating the rectangular beam profile between the source of light (44) and the illumination optics (12).

7. The arrangement according to claim 6, wherein in order to depict color images, a single deformable mirror matrix, as well as a color wheel, are provided, whereby the color wheel is designed as a surface area of a cylinder that is divided into sectors with filters having different colors and that covers at least one of the incident and emergent surfaces of the mixing rod (46).

8. The arrangement according to claim 1, wherein the second optical axis (20) of the projection optics is perpendicular to the surface (25), whereby, as seen in a top view and in a side view, the first optical axis (29), together with second optical axis (20), includes an angle that lies between 0° and 90° in each case, and whereby an incident surface of the prism (10) facing the optical device (28) is arranged in such a way that, as seen in the top view, as well as in the side view, the first optical axis is not positioned perpendicular to the incident surface.

9. The arrangement according to claim 1, wherein the first optical axis (29) and the second optical axis (20) of the projection optics are parallel to each other.

* * * * *